United States Patent
Boyer et al.

(10) Patent No.: US 6,403,659 B1
(45) Date of Patent: *Jun. 11, 2002

(54) SEALER FROM SDA ASPHALT

(75) Inventors: D. Chris Boyer, Huntington, WV (US); Patricia K. Doolin, Ashland, KY (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,312

(22) Filed: Dec. 20, 1999

Related U.S. Application Data

(60) Provisional application No. 60/114,525, filed on Dec. 31, 1998.

(51) Int. Cl.⁷ .................. C09D 195/00; C08L 95/00; B01F 3/08
(52) U.S. Cl. .................. 516/52; 516/38; 106/277; 106/278
(58) Field of Search ............... 516/38, 52; 106/277, 106/278; 208/23, 39; 585/1

(56) References Cited

U.S. PATENT DOCUMENTS

| | | | | |
|---|---|---|---|---|
| 3,093,573 A | * | 6/1963 | Corbett | 208/39 |
| 4,686,027 A | | 8/1987 | Bonilla et al. | 208/39 |
| 5,558,702 A | | 9/1996 | Chatterjee et al. | 106/277 |
| 5,667,576 A | | 9/1997 | Chatterjee et al. | 106/277 |
| 5,728,291 A | * | 3/1998 | Miller et al. | 208/39 |
| 5,961,709 A | * | 10/1999 | Hayner et al. | 106/280 |
| 6,001,162 A | * | 12/1999 | Hayner et al. | 106/274 |
| 6,133,351 A | * | 10/2000 | Hayner | 524/62 |
| 6,267,809 B1 | * | 7/2001 | Boyer et al. | 106/277 |

* cited by examiner

*Primary Examiner*—Daniel S. Metzmaier
(74) *Attorney, Agent, or Firm*—Richard D. Stone

(57) ABSTRACT

An asphalt based sealer for driveways and the like is disclosed. The material uses a blend of solvent deasphalted (SDA) asphalt blended with a cutter stock as the binder or sealer base. Driveway sealer (an emulsion of clay, water and binder) made with this binder has acceptable durability and can be essentially free of coal tar pitch, greatly reducing the toxicity and odor of the sealer.

6 Claims, No Drawings

SEALER FROM SDA ASPHALT

CROSS REFERENCE TO RELATED APPLICATIONS

This application claims the benefit under 35 U.S.C. 119 of prior provisional application No. 60/114,525, filed on Dec. 31, 1998.

BACKGROUND OF THE INVENTION

I. Field of the Invention

The invention relates to an asphalt based sealer for asphalt pavement or metal surfaces.

II. Description of the Prior Art

There are two basic types of driveway or pavement sealer—coal tar based and asphalt based. These materials are primarily used to seal driveways and other pavement surfaces, but can also be used to seal metal surfaces, e.g., pipe coatings.

Coal tar is the premier product and has the largest market share. Driveway sealer made from coal tar is an emulsion of water, coal tar pitch, clay and additives, perhaps with emulsifier and optional ingredients such as sand. These materials are long lasting, have a pleasing black color and are resistant to gasoline and kerosene spills, but have an objectionable odor during application and contain aromatic compounds.

Asphalt based materials are made from distilled petroleum fractions, typically vacuum tower bottoms or perhaps atmospheric tower bottoms. These heavy hydrocarbon fractions are sometimes oxidized or "blown" to change the asphalt properties. Asphalt based sealers do not smell as much as the coal tar based materials and are able to withstand a wider range of temperatures. The asphalt sealers are not as toxic and some states permit only asphalt based sealers to be sold. Asphalt sealers do not have the black color desired by many users. Asphalt sealers do not last as long, and frequently must be reapplied every year or every two years.

So far as is known, the asphalt based driveway sealers are all made with asphalt produced by fractionation. There is another kind of asphalt produced in refineries by solvent deasphalting. In this process, an asphaltene containing crude is mixed with a solvent, or more properly speaking, an anti-solvent such as propane or butane. The presence of large amounts of aliphatic anti-solvent causes the highly aromatic asphaltenic material to precipitate out of solution, or at least form a separate asphalt rich phase. This material, produced as the bottoms or heavy phase in a solvent deasphalting unit, is commonly referred to as SDA or ROSE bottoms.

It is a low value product in many refineries, in some ways almost a distress product. The non-selective nature of the deasphalting process leaves large amounts of non-asphaltenic material in the SDA bottoms. The SDA asphalt is believed to make poor quality roads. Many refiners cut back this material with kerosene or other cutter stock and sell the thinned asphalt as low value fuel oil. U.S. Pat. No. 4,686,027 describes sending SDA asphalt and some solvent to a delayed coker. This shifts some of the work of solvent recovery to the coker and efficiently dispatches the SDA asphalt to the coker.

SDA asphalt has never been used to make driveway sealer because it is soft (and contaminated with heavy oily species which are not asphalt). There is concern that it would "track" asphalt into a house. A refiner or driveway sealer manufacturer may have blended some SDA asphalt into a vacuum bottoms asphalt and produced a low quality driveway sealer, but SDA asphalt was probably not more than 10 or 15% of the total asphalt content of the sealer and there is no literature reference to this application.

U.S. Pat. No. 5,059,300 disclosed use of 1 to 15 wt SDA asphalt mixed with 0.1 to 20 wt of phosphoric acid and the balance being vacuum distilled asphalt.

U.S. Pat. Nos. 5,728,291 and 5,601,697 disclosed blends of SDA asphalt, vacuum distilled asphalt and an aromatic extract for road asphalt.

Representative asphalt driveway sealer art is reviewed below.

U.S. Pat. No. 5,558,702, Chatterjee et al, ASPHALT EMULSIONS CONTAINING AMPHOTERIC EMULSIFIER, taught use of asphalt emulsions to "avoid the use of coal tar and its derivative".

U.S. Pat. No. 5,667,576, Chatterjee et al, ASPHALT EMULSIONS, taught forming an asphalt emulsion from AC-20 asphalt and an emulsifier and mixing with varying amounts of a lime/clay/sand/carbon black mixture.

The '576 patent has a goal of "identifying satisfactory asphalt emulsions which are free of coal tar and coal tar derivatives . . . " It discloses as suitable "either a naturally-occurring asphalt . . . It can be a coal tar or coal tar derivative" (or) "straight-run asphalts, propane asphalts, air-blown asphalts, thermal asphalts, blended asphalts, and the like." While many asphalts are recited, only AC-20 was chosen. AC-20 was, at the time this application was filed on Mar. 24, 1995, an asphalt produced by distillation.

The driveway sealer art and commercial activity could be summarized as follows. Most sales and work reported in the patent literature is of or about coal tar based material. The much smaller sales volume and research work on asphalt based material is believed limited to asphalts obtained by distillation. There is little or no work on use of SDA asphalts for driveway sealers.

We wanted to see if acceptable driveway sealers could be made from SDA asphalts. This would permit a better use of the S DA asphalt and permit production of a low cost driveway sealer with acceptable properties. The SDA asphalt based sealer is not intended to equal in quality the coal tar based product. The SDA, or other solvent derived asphalt product, is intended to be an acceptable substitute for existing driveway sealers made from asphalts obtained by distillation.

The key to successful use of SDA asphalts and the like was use of a relatively high softening point asphalt material and careful mixing with a cutter solvent, preferably a highly aromatic solvent such as an aromatic extract or cycle oil.

BRIEF SUMMARY OF THE INVENTION

Accordingly, the present invention provides a method of making a binder or sealer base of solvent deasphalted asphalt comprising heating a solvent deasphalted (SDA) asphalt having a softening point above 60° C. to a temperature sufficient to maintain a molten state, blending a liquid hydrocarbon cutter oil having less than 10 wt % material boiling below 300° C. with said molten asphalt to form a mixture of molten asphalt and cutter oil.

In another embodiment the present invention provides driveway sealer emulsion of water, clay and sealer base, wherein said sealer base is prepared by the method of the preceding paragraph.

DETAILED DESCRIPTION

For clarity, and to avoid the confusing terminology used in many patents, several terms will be defined. This "definition" section is intended as an overview, with detailed specification for each material provided later.

Driveway sealer means a driveway or paving sealer comprising:
   water,
   clay,
   emulsifier and
   "sealer base" or "binder".

The sealer base or "binder" is the hydrocarbon portion of the driveway sealer. This bonds with or acts as a "binder" for the pavement or driveway. Sealer base of the prior art was coal tar pitch for coal tar based driveway sealers and an asphalt obtained by distillation for prior art asphalt driveway sealers.

Sealer base or "binder" of the invention comprises a blend of:
   asphalt (or bitumen) produced by solvent deasphalting, and
   a cut-back oil.

Prior art driveway sealers used asphalt (or bitumen) obtained as the heavy fraction left after distilling an asphaltic crude. Usually two stages of distillation are used, the first at atmospheric pressure and the second under vacuum distillation to produce a vacuum bottoms asphalt product from which distillable hydrocarbons have been removed. Tar sands from Lake Athabasca and the like may also be eventually conventionally processed and distilled to produce a heavy residue fraction which qualifies as "asphalt" or "bitumen."

Driveway sealers of the invention will use significant amounts of asphalt obtained by a solvent deasphalting process, such as propane deasphalting or the ROSE process. For convenience, such materials will usually be referred to hereafter as SDA asphalt.

It is possible to blend SDA asphalts and asphalts obtained by distillation, and in many instances it will be beneficial to add a pitch component as well. Pitch is defined below.

Pitch could generically be defined as a heavy thermal tar resulting from thermal polymerization of lighter hydrocarbon materials. Coal tar pitch is the product of thermal or destructive distillation of coal. Petroleum pitch is a residue from heat treatment and distillation of petroleum fractions. It is a solid at room temperature, consists of a complex mixture of numerous predominantly aromatic and alkyl-substituted aromatic hydrocarbons, and exhibits a broad softening point range instead of a defined melting point. Ref. *Introduction to Carbon Technologies,* Editors H. Marsh, E. A. Heintz, F. Rodriquez-Reinoso, Secretariado de Pulbicaciones, 1997. Wood tar pitch, never used in driveway sealers, has been made for millennia by "cooking" pine oil or the liquid recovered during charcoal manufacture. All these materials, whether derived from coal tar, petroleum or wood, are "pitch" for the purposes of the present invention.

Pitch is a useful, but not essential, ingredient. Some areas restrict the use of coal tar pitch for driveway sealer, so for these states adding coal tar based pitch is not an option. For most states, coal tar pitch may be added, but will increase the price of the driveway sealer and usually improve the properties of the sealer.

Cut-back oil is a normally liquid hydrocarbon stream which is compatible with both the pitch and the asphalt fraction. There are many normally liquid hydrocarbon streams in a refinery ranging from naphtha fractions to heavy liquids which are only distillable under a vacuum, e.g., vacuum gas oil. Preferred streams are aromatic extracts, cycle oil and slurry oil from FCC columns, and coker gas oils. Low value heavy fuels, complex blends of heavy liquid refinery products, may be used in some applications though some testing is advised because the quality and characteristics of the heavy fuel oils are so variable.

In some cases the refining process can be adjusted to leave the cut-back oil in either the asphalt obtained by distillation (if added) or the pitch product (if added). Examples include running the vacuum column to leave significant amounts of vacuum gas oil (VGO) in the asphalt or adjusting pitch fractionation to leave lighter pitch components such as creosote in the pitch fraction.

Emulsifier means a surfactant, detergent or dispersing agent added to help mix the oil of the sealer base with water to form an emulsion. Use of emulsifiers is well known.

Clay is an essential and well known part of the driveway sealer. The sealer may contain sand, carbon black or other colorants, plastics, thickeners, anti-stripping agents and the like.

Organic anti-strip agents can be used to promote coating and adhesion, increase the resistance of the sealer film to stripping from the clay, or sand particles by the action of water. Anti-stripping additives are selected from a group of amines and amines salt. T. J. Gavin and F. A. Hughes: U.S. Pat. No. 3,347,690, Oct. 17, 1967, assigned to Atlas Chemical Industries, Inc., describe the use and chemistry. Suifficient anti-stripping additive is generally used to give good adhesiveness to the mixture. Generally upwards of 0.1% by weight of the sealer is sufficient to fulfill this requirement. A suitable range of additive found to be both efficient and economical for the mixtures of the process is 0.5% to 1.5% by weight of the sealer.

There is nothing patentable, per se, about any individual component used herein and excellent driveway sealers can be made with "off the shelf" ingredients which are staple articles of commerce.

More details will now be provided about each component.

Each part of the sealer base or "binder" of the invention will now be reviewed in depth, namely the SDA asphalt and the cut-back oil, and the optional pitch material and asphalts obtained from distillation. After this review of the individual components, preferred ratios or blends of various materials will be reviewed, ending with a brief discussion of some conventional additives for driveway sealer (clay, sand, colorants, and the like) and other sealer applications.

SDA Asphalt

This is an essential part of the sealer base and the driveway sealer made with the sealer base. It is produced in more than 50 refineries in the US though rarely sold as a separate product because of its poor quality for conventional asphalt uses. Most of it is diluted with kerosene or other liquid hydrocarbon cutter stock and sold as #6 oil or other low value fuel oil product. Some may be disposed of by charging to a coker.

In our process, the SDA asphalt is the primary, or even sole, asphalt component. In general, any asphalt separated by solvent extraction from non-asphaltic components can be used. Propane deasphalting is believed to be the dominant deasphalting technology, though recovery of the deasphalting solvent by operating some portions in the process in the supercritical regime (ROSE) is favored for energy efficiency. More details of some solvent deasphalting processes are disclosed in U.S. Pat. Nos. 3,998,726 and 3,972,807, which are incorporated by reference.

The SDA process, and the fractionation columns upstream of it, preferably are run, and the crude processed selected, to produce an asphalt with the following properties:

Broadly: 180° F. or greater softening point

Preferred: >190° F. softening point

The extent of solvent extraction and the resulting softening point of the SDA bottoms impact the hardness of the pavement sealer base made therefrom. SDA bottoms should possess a softening point of $\geq 80°$ F. to produce a pavement sealer with acceptable hardness as measured by the Ring & Ball (R&B) softening point of residue after distillation according to ASTM D-20 distillation to 300° C. A residue R&B softening point of 40° C. or greater is normally required for acceptable performance in pavement sealers. A softer pavement sealer may rut and track with heavy traffic. A preferred R&B softening point of residue is 45–55° C. for premium sealers.

Asphalt from Distillation

While this asphalt fraction will usually be a minority component of the total amount of asphalt used, it can be an important contributor to higher quality product.

Asphalt from distillation can be any heavy hydrocarbon fraction having certain minimum specifications. Preferred are asphalt fractions from asphaltic crudes produced by vacuum distillation. These materials may be "air blown", oxidative thermal processing to increase viscosity or "viscosity penetration index" or some other property, using conventional technology disclosed in U.S. Pat. No. 4,052,290.

TABLE 1

REQUIREMENTS FOR ASPHALT CEMENT GRADED BY VISCOSITY AT 60° C. (140° F.)
(Grading based on original asphalt)

| Test | Viscosity Grade | | |
|---|---|---|---|
| | AC-5 | AC-10 | AC-20 |
| Viscosity, 60° C. (140° F.), poises | 500 + 100 | 1,000 + 200 | 2,000 + 400 |
| Viscosity, 135° C. (275° F.), cSt, Min | 110 | 150 | 210 |
| Penetration, 25° C. (77° F.), 100 g., 5 sec-min | 120 | 70 | 40 |
| Flash Point, COC, ° F. - Min. | 350 | 425 | 450 |
| Solubility in trichloroethylene, % Min | 99.0 | 99.0 | 99.0 |
| Tests on residue from Thin-Film Oven Test: | | | |
| Viscosity, 60° C. (140° F.), poises-maximum | 2,000 | 4,000 | 8,000 |

TABLE 1-continued

REQUIREMENTS FOR ASPHALT CEMENT GRADED BY VISCOSITY AT 60° C. (140° F.)
(Grading based on original asphalt)

| Test | Viscosity Grade | | |
|---|---|---|---|
| | AC-5 | AC-10 | AC-20 |
| Ductility, 25° C. (77° F.) @ 5 cm/Min, Min | 100 | 50 | 20 |

Spot test (when and as specified) (2) with: Standard naphtha solvent Negative for all grades
Naphtha-Xylene-solvent, % Xylene Negative for all grades
Heptane-Xylene-solvent, % Xylene Negative for all grades
(1) If ductility is less than 100, material will be accepted if ductility at 15.6° C. (60° F.) is 100 minimum.
(2) The use of the spot test is optional, When it is specified, the Engineer shall indicate whether the standard naphtha solvent, the naphtha-xylene solvent, or the heptane-xylene solvent will be used in determining compliance with the requirement, and also, in the case of xylene solvents, the percentage of xylene to be used.

Pitch

Pitch is an optional and expensive component. Minor amounts of pitch may be added to improve the qualities of the sealer.

When added, the pitch component can be any pitch material meeting the specifications summarized at the end of this section. The pitch can be derived from coal, petroleum or even wood. In most commercial uses, either coal tar pitch or petroleum pitch will be used.

Coal tar pitches may be made using the method and apparatus of U.S. Pat. No. 4,066,159, METHOD AND APPARATUS FOR THE CONTROL OF PITCH STILL OPERATION. An oxidized coal tar distillation cut may also be used as disclosed in U.S. Pat. No. 4,537,635.

Petroleum pitches may be made using the method disclosed in U.S. Pat. No. 4,671,848 (Ashland), U.S. Pat. No. 4,243,513 (Witco), U.S. Pat. No. 3,140,248 (Mobil).

Eminently suitable for use herein are the petroleum pitch products available from Marathon Ashland Petroleum and sold under the designation A-240, A-225 and A-170 and from British Petroleum sold under the designation of Trolumen 250.

TABLE 2

Specifications and Typical Properties of Marathon Ashland Petroleum Pitch
CAS Number 68334-31-6

| Analysis | Test Method | A170 Pitch[1] | A240 Pitch[1] | A225 Pitch[1] | Trolumen Pitch[2] |
|---|---|---|---|---|---|
| Specification Points | | Limits | | | |
| Softening Point, Mettler ° C. | ASTM D3104 | 79.4–82.6 | 118–124 | 105–110 | NA |
| Softening Point, Ring & Ball ° F. | ASTM D36 | 166–171 | 235–248 | 212–221 | 121 |
| Flash, Cleveland Open Cup, ° C. minimum | ASTM D92 | 200 | 270 | 260 | NA |
| Coking Value, Modified Conradson Carbon, wt %, minimum | ASTM D2416 | NA | 49 | 46 | 42 |
| Sulfur Content, wt % maximum | ASTM D1552 or D4294 | NA | 3.0 | 1.5 | 2.0 |
| Typical Properties | | Values | | | |
| Specific Gravity, Helium Pycnometer, g/cc, minimum | ASTM D71 | 1.18 | 1.22 | 1.22 | 1.18 |
| Moisture, wt %, maximum | — | — | — | 0.5 | — |

TABLE 2-continued

Specifications and Typical Properties of Marathon Ashland Petroleum Pitch
CAS Number 68334-31-6

| Analysis | Test Method | A170 Pitch[1] | A240 Pitch[1] | A225 Pitch[1] | Trolumen Pitch[2] |
|---|---|---|---|---|---|
| Toluene Insolubles, wt %, minimum | ASTM D4072 | — | 2.10 | 2.10 | — |
| Quinoline Insolubles, wt % maximum | ASTM D 2318 | 0 | 0.5 | 0.5 | — |

[1]Marathon Ashland Petroleum LLC Refinery Specification Book
[2]Literature values Cut-Back Oil This is an essential ingredient of the sealer base and the driveway sealer (and other sealers) made therefrom. There are a variety of refinery liquid hydrocarbon streams which can be used, though not necessarily with the same results. These include:

FCC light cycle oil

FCC heavy naphtha

FCC slurry oil, or clarified slurry oil

Gas oil

Vacuum Gas Oil

Coker naphtha

Coker gas oil

Fuel oil (#6, #2, bunker fuel, etc.)

Aromatic Extracts

A flash point specification or phase compatibility limit usually sets the minimum boiling point or front end volatility of such streams.

In general, heavy liquid hydrocarbon streams are better "co-solvents" or cut-back oils than light liquid hydrocarbon streams.

In general, highly aromatic streams are better solvents for the condensed, multi-ringed aromatic structures which make up both the pitch and asphaltic fractions.

Such materials are well known and widely sold, and further discussion thereof is not necessary as one could go to a refinery and purchase these streams.

Critical cut-back oil properties are somewhat dictated by the initial softening point of the pitch, but in general for the examples specified are:

Cleveland Open Cup Flash (COC) of 270–400° F.

Viscosity, Fural @ 122° F. of between 20–50 seconds

Cut-back oils are preferentially aromatic in nature to provide the best solvency to the system. Aliphatic oils may produce a silvery sheen due to incapability with the highly aromatic pitch. However, use of pure distillate streams as cutter oils instead of slurry oil or fuel oils which are producing from cracking processes would produce additional improvement in environmental impact in addition to replacing coal tar with either petroleum pitch and/or asphalt if found to be sufficiently compatible.

SDA Asphalt/Cut Back Solvent Ratios

Softening point of the SDA asphalt influences the amount of cutter stock that is required to prepare a pavement sealer base with a softening point of 40° C. and viscosity of >100 centipoise as measured by rotational Brookfield. Generally the higher the softening point the greater the quantity of cutter stock required, thereby exhibiting a higher cutter oil to asphalt ratio.

| Softening Point of SDA Asphalt | Ratio of Cutter Oil to Asphalt |
|---|---|
| >180 | <0.4 |
| 180–190 | 0.4–0.5 |
| 190–200 | 0.5–0.6 |

Coal Tar/Petroleum Pitch Ratios

The process and sealer of the present invention may include some petroleum pitch, coal tar pitch or a mixture of coal tar pitch and petroleum pitch, when the odor or toxicity of the coal tar pitch can be tolerated.

Preferably, the sealer base, and the finished driveway sealer material, will be coal tar free because small amounts of coal tar increase the toxicity of the material and make it difficult to sell in restricted areas. Petroleum pitch is believed to be less toxic than coal tar pitch and is preferred.

When mixtures of coal tar and petroleum pitch are used, it is beneficial when the petroleum pitch is at least a majority of the pitch component.

When large amounts of coal tar can be tolerated, the pitch ma y be a blend of 10–95 wt %, preferably 25–50 wt % of the total pitch component. A blend of 35–45 wt % petroleum pitch and 65–55 wt % coal tar pitch gives good results.

Pitch/Asphalt Ratios

In general, the higher pitch content means better quality, color and longevity but higher expense and increased concern about carcinogens. One of the objects of the present invention is to develop a sealer base with a greatly reduced, or eliminated, coal tar pitch content. Another object is a sealer base which provides satisfactory service for at least a year and which uses SDA asphalt to reduce cost.

At a minimum, the asphalt fraction should comprise at least 10 wt % of the total (asphalt+pitch content), and preferably the asphalt fraction is at least 15 wt % of this total, more preferably 25 wt %, and most preferably more than 50 wt %.

If the asphalt content of the (pitch +asphalt) is small, on the order of 5–10 wt %, there is little beneficial effect. The product will be of good quality, but still have essentially all of the carcinogens and odor of the pure coal tar product. A significant reduction in odor and carcinogen concentration occurs when the asphalt displaces most, and preferably all, of the coal tar pitch component.

Surprisingly, there is a significant benefit from adding minor amounts of pitch to the SDA asphalt, with a marked improvement in product properties when as little as 10 weights of pitch are added per 100 weights of asphalt. Adding even such minor amounts of pitch causes a marked improvement in the finished emulsified sealer wear resistance. Addition of 15% pitch in the asphalt binder essentially doubles the wear resistance of the finished sealer base as defined by the modified scrub test.

Binder (Sealer Base) Properties

This section reviews the ratios of (SDA asphalt+pitch) to cut-back oil, both in terms of relative ratios of each and in terms of finished sealer base properties.

The finished sealer base normally must meet the following specifications for use in a driveway sealer formulation.

Excellent results are achieved when the SDA asphalt comprises a majority, by weight, of the total (asphalt+pitch), and when there is a pitch component of 10 to 50% by weight.

TABLE 3

| Property | Method of Test | Specification |
|---|---|---|
| Float @ 50° C., seconds | ASTM D139 | 190–300 |
| Flash Point, COC, ° C. | ASTM D92 | >165 |
| Ash, wt % | ASTM D2415 | 0.3 max |
| ASTM D-20 Distillation | | |
| 0–170° C. | | 0.0 |
| 0–270° C. | | 6.0 max |
| 0–300° C. | | 15.0 max |

Many of these properties are specified for safety (flash point) or ability to work with these materials in the field (viscosity).

Great latitude is possible on ratios of cut-back oil to (pitch+SDA asphalt) because both the pitch and the asphalt can be manufactured to contain their own cutter stock.

A coal tar pitch still operation can be adjusted so that the cut withdrawn from the pitch still contains significant amounts of lighter material. This "sloppy" fractionation of coal tar pitch is commonly used to make the grades of coal tar pitch required for driveway sealer base.

A petroleum pitch still can be run the same way as a coal tar pitch still, i.e., leave lighter material in the heavy pitch product. A special low softening pitch, much lighter than say A-240 pitch, may be produced in this way. The A-240 pitch is present in the product, but, as produced from the pitch still, will contain enough lighter material that the softening point is much lower than that of A-240.

In practice, many refiners will prefer to operate their pitch stills at constant conditions and produce, e.g., A-240 pitch and dilute it or add "cut-back" oil to produce a pitch with a lower softening point.

It is especially beneficial if the pitch component is a fairly high softening point material and the cut-back oil has a relatively low front end volatility. This allows the front end volatility of the sealer base, and flash point, to be accurately controlled. Pitch fractionation is a bit difficult to do because the streams are so heavy. Running the pitch still to make a fairly consistent heavy product permits reliable operation without fear of dumping a lot of light ends in the heavy pitch product. Normally liquid hydrocarbon streams, such as FCC cycle oils or slurry oil, are fairly easy to fractionate and the fractionation equipment used can produce fairly accurate "cuts" of the liquid hydrocarbons so that a relatively narrow boiling range cut-back oil can be obtained.

The discussion which follows presumes that refiners (both coal tar and petroleum pitch) produce pitch products with a softening point of around 240° F. If any pitch product used herein has a significantly lower (or higher) softening point, the amount of cut-back oil added to the sealer base is reduced (or increased) by the amount of cut-back oil needed to produce a pitch with a 240° F. softening point.

Phrased another way, the amount of cut-back oil specified for the sealer base recipe includes the amount of cut-back oil present in (or required to be added to) the pitch component, if the pitch does not have a softening point of about 240° F.

TABLE 4

Cutter Oil Requirements for Sealer Base

| Recipe for Sealer @ 40° C. Softening Point | #6 Fuel Oil, wt % | SDA Bottoms, wt % | Pitch Sealer Component |
|---|---|---|---|
| Example 1 | 4.5 | 10.5 | 85 wt % |
| Example 2 | 7.5 | 17.5 | 75 wt % |
| Example 3 | 15 | 35 | 50 wt % |

Additives

There are some additional components which are preferred for sealer base and also for generalized sealing, such as coating metal surfaces. These materials are commercially available and, per se, form no part of the present invention.

Emulsifying Agents

Suitable emulsifying agents can include aqueous polyvinylalcohol, aqueous amines, aqueous compounded amines such as those available from Akzo Chemicals and sold under the tradename Redicote (i.e., Redicote E-9) or those available from B. F. Goodrich Chemical Co. and sold under the tradename Carbopol, and aqueous solutions of aliphatic fatty acids and caustic (usually sodium hydroxide). Exemplary amines are commercially available primary aliphatic amines, trimethylaminediamines such as N-alkyl trimethylenediamine, polyethoxylated aliphatic amines and diamines ($C_8$ to $C_{18}$), amine acetate salts derived from primary, secondary or tertiary amines with the alkyl group ranging from $C_8$ to $C_{18}$, high molecular weight aliphatic primary, secondary or tertiary amines ($C_8$ to $C_{18}$), and quaternary ammonium salts containing one or two alkyl groups ranging from $C_8$ to $C_{18}$. Compounded amines are commercially available and are generally complexed or otherwise stabilized compositions with preserved amine functionality. Ionic aliphatic fatty acids include nonionic polyethoxylated fatty acid compositions available under the tradename Ethofat and other commercially available fatty acid, tall oil and tallow or animal fat ($C_8$ to $C_{18}$) based cationic emulsifiers. Emulsifers are present in the asphalt sealing compositions in amounts ranging from 0.1 to 10 wt %, preferably from 2 to 5 wt %, say about 1 to 3 wt % based on 100% of the sealer composition.

The appearance-enhancing additive can be selected from the group consisting of tallow, carbon black, dyes, and pigments. Appearance-enhancing additive is present in the asphalt sealing compositions in amounts ranging from 0.1 to 10 wt %, preferably from 1 to 4 wt %, based on 100% of the sealer composition.

Clay

Essentially all driveway sealers contain a clay component. Such materials are well known and widely used.

Other Additives

In addition to clay, sand or ground up particles of rubber or tires may be added to improve traction or provide a better wear surface or for esthetic reasons.

Sealers for Metal Surfaces/Waterproofing

In addition to use as a driveway sealer, the sealer base may be used as is or modified to permit use for pipe coating or the like. The material may also be used as a waterproofing agent for wood, metal and cementitious materials.

For some uses, the sealer base may be used in neat form to paint or spray on wood or metal surfaces. Clay or water may be used optionally. Viscosity may be adjusted to meet requirements for spraying.

EXAMPLES

The procedures used in the Examples which follow were the same.

In practice, the solvent extracted bottoms material is placed in a storage tank at a temperature sufficient to maintain molten state. The cutter oil, held at 100–200° C., is transferred slowly into the bottom of the tank as the temperature slowly decreases or moderates. The blend is monitored until it reaches the final target properties. (Table 5)

TABLE 5

| Property | Test | End Point |
| --- | --- | --- |
| Float Test @ 50° C., sec | ASTM D 139 | 170–280 |
| Distillation wt % | ASTM D 20 | |
| 0-170° C. | | 0.0 |
| 0-270° C. | | 1.2 max |
| 0-300° C. | | 3.5 max |
| Softening Point of Residue @ 300° C. | ASTM D 36 | |
| R&B, ° C. | | 45–55 |
| Flash Point, COC, ° C. | ASTM D 92 | 167 min |

Example 1

A sealer base is prepared by blending 50–80% of a solvent extracted bottoms material with 20–50% fuel oil ranging in viscosity of 20–60 sec, Saybolt Fural @ 50. The fuel oil is added slowly to the molten bottoms and mixed thoroughly until the characteristic softening point of 30–50° C. by Mettler is reached. The mixture is mixed for approximately one hour to insure homogeneity. Laboratory analysis of blends show that a softening point of $\geq 180°$ F. is needed when combined with fuel oil to produce a finished blend which meets the specification measured by ASTM D 36.

Example 2

A sealer base (B2250-86) is prepared by blending 60 wt % of a solvent extracted bottoms (93° C. softening point) with 40 wt % of an aromatic extract oil. The molten bottoms is held at 145° C. while slowly adding the extract oil with mixing until the mixture reaches the characteristic end point of 40.3° C. Mettler softening point. Laboratory characterization date are presented in Table 6.

TABLE 7

| Property | Example 2 |
| --- | --- |
| Float Test @ 50° C., sec | 284 |
| Distillation, wt % | |
| 0–170° C. | 0 |
| 0–270° C. | 0.7 |
| 0–300° C. | 2.3 |
| Softening Point of Residue @ 300° C., R&B, ° C. | 49 |
| COC Flash, ° C. | 260 |

Discussion

The examples show that a material meeting all the product specifications of "sealer base" can be made from SDA asphalt and other low cost refinery streams (fuel oil and aromatic extract).

The "sealer base" is compatible with and may be a partial or complete replacement for the coal tar based products cLirrently used to make finished driveway sealer. Thus no change is needed in manufacturing or storage procedures.

The use of SDA asphalt and cut-back oil permits the valuable and dwindling supply of pitch to be extended or diverted to other uses. The invention also allows for use of SDA asphalt, permitting the asphalt obtained by distillation to be used for making roads or other higher value uses.

The finished driveway sealer product of the present invention will not equal a pure coal tar based driveway sealer, which remains the premium product. The driveway sealer of the present invention will be better than the conventional asphalt driveway sealer materials and will be significantly less toxic than the coal tar materials.

Modifications

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference, including any patents or other literature references cited within such documents.

We claim:

1. A driveway sealer emulsion comprising of water, clay, emulsifier and sealer base, wherein said sealer base is prepared by the method of:

a. heating a solvent deasphalted (SDA) asphalt having a softening point above 60° C. to a temperature sufficient to maintain a molten state and produce molten asphalt;

b. blending a liquid hydrocarbon cutter oil having less than 10 wt % material boiling below 300° C. with said molten asphalt to form a sealer base comprising a mixture of molten asphalt and cutter oil; and wherein the sealer base may optionally comprise pitch and wherein the solvent deasphalted (SDA) asphalt comprises a majority of the asphalt and pitch.

2. Driveway sealer of claim 1 wherein said liquid hydrocarbon cutter oil is selected from the group of fluidized catalytic cracking (FCC) light cycle oil, FCC heavy naphtha, FCC slurry oil or clarified slurry oil and gas oil, vacuum gas oil, coker naphtha, coker gas oil, fuel oil, and aromatic extract.

3. The driveway sealer emulsion of claim 1 wherein said cutter oil is aromatic extract.

4. The driveway sealer of claim 2 wherein said liquid hydrocarbon cutter oil has a Cleveland Open Cup Flash (COC) of 270–400° F., and a Viscosity, Fural at 122° F. of between 20–50 seconds.

5. A driveway sealer emulsion of water, clay, emulsifier and sealer base, wherein said sealer base comprises a mixture of solvent deasphalted (SDA) asphalt having a softening point above 60° C. and petroleum refinery derived stream having less than 10 wt % material boiling below 300° C. selected from the group consisting of one or more of fluidized catalytic cracking (FCC) light cycle oil, FCC heavy naphtha, FCC slurry oil, FCC clarified slurry oil, gas oil, vacuum gas oil, coker naphtha, coker gas oil and aromatic extract; and wherein the sealer base may optionally comprise pitch and wherein the solvent deasphalted (SDA) asphalt comprises a majority of the asphalt and pitch.

6. The driveway sealer of claim 5 wherein said petroleum refinery derived stream has a Cleveland Open Cup Flash (COC) of 270–400° F., and Viscosity, Fural at 122° F. of between 20–50 seconds.

* * * * *